(12) United States Patent
Herberger et al.

(10) Patent No.: US 7,164,906 B2
(45) Date of Patent: Jan. 16, 2007

(54) SYSTEM AND METHOD OF MUSIC GENERATION

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 329 days.

(21) Appl. No.: 10/961,282

(22) Filed: Oct. 8, 2004

(65) Prior Publication Data

US 2006/0079213 A1    Apr. 13, 2006

(51) Int. Cl.
*H04M 3/42*    (2006.01)
*H04M 3/00*    (2006.01)
*H04B 11/00*   (2006.01)

(52) U.S. Cl. ............... 455/414.1; 455/418; 455/344

(58) Field of Classification Search ............. 455/414.1, 455/412.2, 418, 550.1, 556.1, 567, 575.1, 455/401, 3.06, 344; 84/615, 618, 611, 612, 84/631
See application file for complete search history.

(56) References Cited

U.S. PATENT DOCUMENTS

| | | | |
|---|---|---|---|
| 4,417,494 A * | 11/1983 | Nakada et al. | 84/612 |
| 5,393,927 A * | 2/1995 | Aoki | 84/631 |
| 5,492,049 A * | 2/1996 | Aoki et al. | 84/611 |
| 6,083,009 A | 7/2000 | Kim et al. | |
| 6,094,587 A * | 7/2000 | Armanto et al. | 455/567 |
| 6,549,767 B1 * | 4/2003 | Kawashima | 455/412.2 |
| 6,718,186 B1 * | 4/2004 | Aoki | 455/567 |
| 6,907,113 B1 * | 6/2005 | Holm et al. | 379/88.23 |
| 7,058,428 B1 * | 6/2006 | Yamaki et al. | 455/567 |
| 7,069,058 B1 * | 6/2006 | Kawashima | 455/567 |
| 2001/0012793 A1 | 8/2001 | Aoki et al. | |
| 2001/0053692 A1 | 12/2001 | Ito et al. | |
| 2002/0010740 A1 | 1/2002 | Kikuchi et al. | |
| 2002/0034302 A1 | 3/2002 | Moriai et al. | |
| 2003/0027591 A1 | 2/2003 | Wall | |
| 2003/0045274 A1 | 3/2003 | Nishitani | |
| 2003/0110926 A1 | 6/2003 | Sitrick et al. | |
| 2003/0119443 A1 * | 6/2003 | Futohashi | 455/3.06 |
| 2003/0224767 A1 * | 12/2003 | Futamase et al. | 455/414.1 |
| 2004/0176025 A1 | 9/2004 | Holm et al. | |
| 2004/0176149 A1 * | 9/2004 | Futohashi | 455/575.1 |
| 2004/0266336 A1 * | 12/2004 | Patsiokas et al. | 455/3.04 |
| 2005/0090292 A1 * | 4/2005 | Yasutake | 455/567 |
| 2005/0235811 A1 * | 10/2005 | Dukane | 84/612 |

FOREIGN PATENT DOCUMENTS

| | | |
|---|---|---|
| EP | 1 195 974 A1 | 4/2002 |
| JP | 2002111804 A | 4/2002 |
| JP | 2002273061 A | 9/2002 |
| JP | 2002358088 A | 12/2002 |
| JP | 2003066972 A | 3/2003 |
| WO | WO 02/093873 A1 | 11/2002 |

\* cited by examiner

*Primary Examiner*—Sonny Trinh
(74) *Attorney, Agent, or Firm*—Fellers, Snider, Blankenship, Bailey & Tippens, P.C.; Terry L. Watt (57) ABSTRACT

There is provided herein a system and method for generating music on multiple cell phones or other mobile computing devices, wherein two or more users (to include a user and a computer) acting together may create a joint musical work. The instant methods enable multiple users to create music in a synchronized fashion by using their cell phones or other portable electronic devices as musical instruments. The instant invention has been made possible because of the enhanced processor power within mobile electronic devices and has the potential to create added value in such devices by assisting users in exploiting multimedia features of their cell phones.

26 Claims, 5 Drawing Sheets

SYSTEM AND METHOD OF MUSIC GENERATION

FIELD OF THE INVENTION

The present invention relates generally to the creation of music on cell phones or other portable electronic devices. More particularly, but not by way of limitation, the present invention relates to a synchronized music creation process wherein a multi-device, multi-user music creation process can be enabled.

BACKGROUND OF THE INVENTION

In recent years the market for cell phones has been continuously increasing, and this has especially been true of during the last 5–8 years, during which time there has been near-explosive growth in cell phone numbers and in the associated technology. Those of ordinary skill in the art will know that cell phones have evolved far beyond their humble beginnings as a product where early models were large/low functionality devices. Today, improvements in the technology of cell phone hardware and its associated communications protocols have decreased the size of cell phones and increased their functionality to the point where they have begun to supplant stand-alone devices such as personal information managers, digital cameras, etc. Cell phones which initially were limited to performing the basic telephone and minimal task planning functions today have evolved into small portable computers which utilize their own internal microprocessor, memory, and display device to provide features such as internet connectivity, receipt of email, and calendar functionality, etc. Additionally, and of particular importance to the instant disclosure, many cell phone models also include multimedia capabilities. These capabilities might include digital photography, AM/FM radio reception, interactive games that are played on the cell phone's LCD screen, and possibly some ability to play digital audio files (e.g., mp3 files). The increase in internal processing power has encouraged the development of open-architecture operating systems that allow for customisation or development of additional applications by third parties.

That being said, it should be noted that the multimedia capabilities of cell phones are typically limited to a "create the media—transfer the media" level of functionality. For example, the audio features in a cell phone typically include capabilities such as creating a ring tone, storing audio files, listening to audio files and recording audio data. Of course, these features are designed to be experienced solely by the cell phone owner and feature only a very limited ability to work with the provided audio data. Even though the central purpose of a cell phone is interaction with another person, to date no known multimedia function permits one cell phone user to interact in a cooperative way with another while utilizing the multimedia capabilities of his or her phone.

Of course, a central problem in this regard is in synchronizing the two (or more) cell phones that are involved in the interaction. That is, since each cell phone is essentially an autonomous computer, any attempt to create an interaction between two of them must necessarily begin by establishing a common synchronization, else, interchanges between their respective owners will be out of sync and the interchange will likely lose its appeal.

Thus what is needed is a method which enables a cell phone user to utilize the multimedia features of his or her cell phone so as to interact with one or more other cell phone users with similar multimedia features. It is further necessary that some method of synchronizing the two or more devices be provided so that the interaction can be more enjoyable for the participants. Finally, what is especially needed is for two or more cell phone users to be able to create an interactive audio or music experience by utilizing their respective phones such that the composite output is synchronized between the two phones.

Heretofore, as is well in the cell phone, and multimedia arts, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided herein a system and method for generating music on multiple cell phones or other mobile computing devices, wherein two or more users (to include a user and a computer) acting together may create a joint musical work.

According to a first aspect of the instant invention, there is provided a method of music creation which utilizes a plurality of cellular phones to create a musical composition. In first a preferred embodiment (the "play with" mode hereinafter), a cell phone will have been pre-loaded with specialized music creation software as is described more fully hereinafter. As a first step, an owner of such a cellular phone selects a song, or selects an option that allows him or her to create a song and sets a tempo. The tempo is preferably set by tapping one of the cell phone keys. The initiating user will then invite others who are in his vicinity to join in, the inviter's phone being referred to hereinafter as the "master" phone. Any user who so desires may configure his or her own cell phone to play the same (or a complementary) musical work. Preferably, upon receipt of acknowledgement from the participating users that they are ready, the inviter presses a button to initiate the playing of the selected song. Prior to the song's start, however, an audible series of tones (e.g., "beeps") is preferably generated by the master phone to indicate the selected tempo of the music that is to follow. This series of tones allows the participants to manually synchronize their phones (i.e., the "slave" phones) to the master, preferably by pressing a designed key in time to the tones. Thus, the tempo of the chosen musical work is communicated to each accompanying/slave phone. By doing this, the slave phones will be at least approximately in synchronization with the master phone. Alternatively, each user may synchronize his or her cell phone by "tapping in" after the master phone has already started playing a musical work, e.g., by pressing a cell phone button in time to the in-progress playing of the chosen musical work. However, such may not result in cooperative works that are as euphonious as those where all of the cell phones start together.

During the playing of the song, the initiator and the invitees individually press buttons on their respective cell phone faces. Each such button press results in the playing of a sound of some sort through the cell phone speaker in conjunction with the playing of the selected musical work. In one preferred embodiment, each sound is a simple beep such as is available by default in telephones (e.g., the standard DTMF phone tones) and/or others sorts of tones that are synthesized internally by the phone. In other preferred embodiments, each button might be associated with a single digitally recorded sound (e.g., a horn playing a single note), a recorded musical phrase (e.g., one digitally sampled measure of a piano playing), or even more complex recorded sounds. Of course, those of ordinary skill in the art will recognize that, given these tools, the participating parties would be able to not only accompany a playing song but they would also be able to create new musical arrangements out of the selected and played digitally recorded sounds and/or music sound loops.

In other embodiments, the software within the cell phone will act to help the user select which specific sounds are played in response to a button press and the timing of those sounds. For example, in one preferred embodiment the user's button press is only used to determine the relative timing of the note that is played, with the actual sound selection being made automatically so as to complement the musical work that is playing. In this embodiment, the user could repeatedly press the same key with a potentially different/complementary sound being played each time the key is pressed. In another preferred embodiment, the user's button press will not be played immediately, but instead the sound that corresponds thereto will be played in exact tempo with the currently playing musical work. Obviously, such an arrangement would be a boon to the user who is rhythmically challenged.

According to another preferred embodiment, there is provided a system and method substantially as set out above, but wherein a user plays an accompaniment with, for example, a computer (i.e., the "play along" mode, hereinafter). In this embodiment, the user would typically access the computer and select a musical work. Then, optionally and in one embodiment, the user would select that same musical work on his or her own cell phone and then accompany the computer while it plays. In contrast to the "play with" mode discussed previously, in the "play along" mode the user preferably will not need to configure any specific settings on the "master" device. Additionally, there will preferably be no need to transmit lead-in tones that originate in the "master" device. The user who wants to play along with such a device need not necessarily synchronize the accompaniment to the start of the song from the "master." Instead, the user will preferably begin to "play along" at any time during playback. One preferred method of implementing this feature is to have the user, upon hearing the song being played, tap along with it, such tapping providing the instant invention with an approximate measure of the song's tempo. This user will preferably be required to tap in concert with the playing song until the tempo determination has sufficient information to estimate the tempo of the song with some degree of accuracy.

In still another preferred embodiment, each participating non-master cell phone will utilize software that functions as a recognition engine for purposes of automatically synchronizing one or more cell phones. In more particular, according to the instant embodiment the master cell phone will signal to cell phones proximate thereto that a song is about to commence, preferably by sounding a series of tones through its speaker. This series of tones will preferably be sonically distinct so that the non-master phones will be able to distinguish them from background noise. In the preferred arrangement, the recognition engine within each participating cell phone will hear the transmission, determine the tempo associated therewith, and begin to play its own copy of the chosen song at the appropriate moment, thereafter allowing the user to accompany the playing song according to the methods discussed previously.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to apply to all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Referring now to the drawings, wherein like reference numerals indicate the same parts throughout the several views, there is provided a preferred system and method for enabling a user to implement a synchronized music creation process which utilizes one or more cellular phones playing together in concert. In more particular, there is provided herein a system and method for generating synchronized music on multiple cell phones or other mobile computing devices, wherein two or more users (to include a user and a computer) acting together may create a joint musical work. In the preferred arrangement, the same musical work will be synchronously played through the speaker of each participating cell phone. The owner of each cell phone will then press one or more buttons on the face of his or her phone in time with the playing of the musical work, each button press preferably generating a sound that is aesthetically consistent with the selected musical work, thereby creating a pleasing musical experience for the participants.

Figure 1:
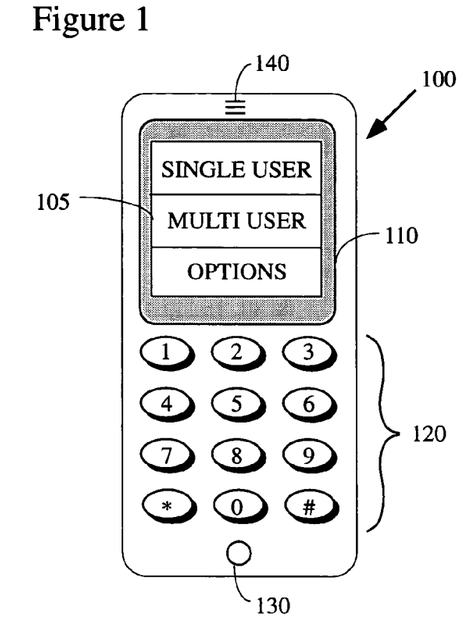
FIG. 1 depicts a preferred selection menu of the instant method while executing on a user's cell phone.

As is generally indicated in FIG. 1, at least a portion of the instant invention will be implemented in the form of software running on a user's cell phone 100. Such a cell phone will preferably have some amount of internal program memory and data storage (e.g., computer RAM) which is normally supplied with such units. Additionally it is anticipated that the instant invention will utilize the speaker 140 and microphone 130 of the cell phone 100 and/or a separate speaker/amplifier combination that is in electronic communication with the cell phone 100. Of course, those of ordinary skill in the art will recognize that a cell phone might have more than one speaker. For example, it might have one that is used during phone calls and another that is used to signal an incoming call (i.e., play a ring tone) or that allows the phone to be used as a speakerphone. Thus, for purposes of the instant disclosure when the term "speaker" is used that term should be broadly construed to include any of the one or more speakers that might be utilized by a cell phone. Further, users often utilize a microphone-type audio input that is different from that provided within the body of the cell phone (e.g., many cell phones can be utilized with a separate wired or wireless headset that contains a microphone and speaker) and, as a consequence, when the term "microphone" is used herein that term should be understood to mean any sort of audio input device whether it is integral to the cell phone or not. Additionally, it should be noted that, although the preferred embodiment utilizes one or more cell phones, as will be made clear later, in reality any portable device that can be made to execute a computer program (e.g., it contains a microprocessor or a similar programmable chip) and that contains even a rudimentary speaker and some means of interacting with the user might be utilized.

Figure 2:
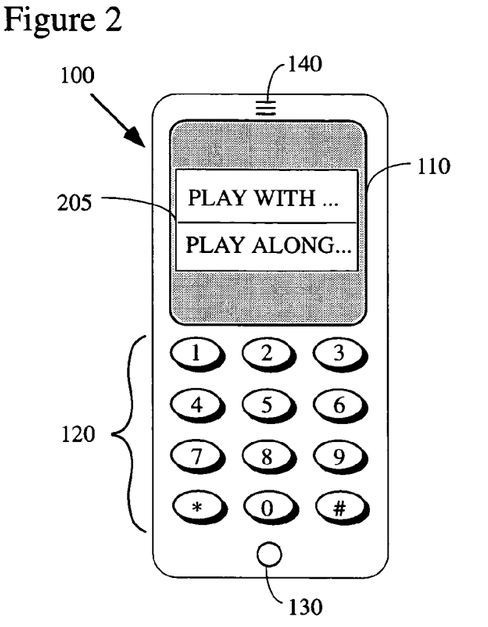
FIG. 2 illustrates another preferred menu of options as displayed on a cell phone.
Figure 3:
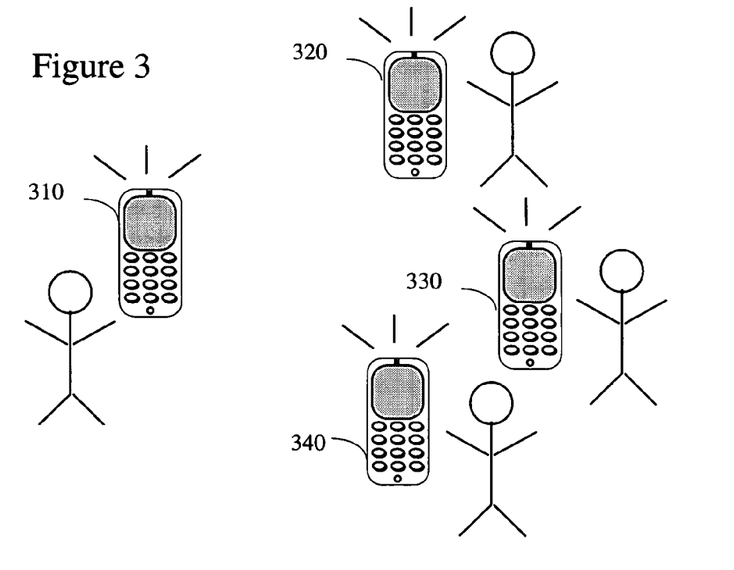
FIG. 3 contains an illustration of a preferred master/slave cell phone arrangement suitable for use with the instant invention.
Figure 4:
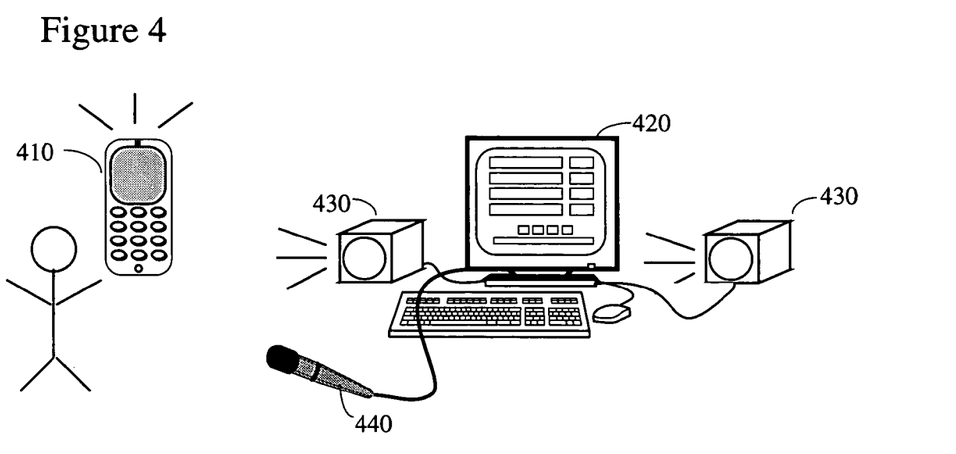
FIG. 4 depicts illustrates a preferred general environment of the "play along" embodiment of the instant invention.

According to a preferred arrangement, and as is generally indicated in FIGS. 1, 2, and 3, each user's cell phone 310–340 will preferably contain software resident therein that presents the user with menu choices 205 (FIG. 2) via the cell phone display 110. As is indicated in FIGS. 1 and 2, the instant invention features two preferred modes of operation: a "play with" mode and "play along" mode. In brief, the "play with" mode allows a user to create a musical composition in cooperation with one or more other users, wherein the other "users" might be human beings or a computer, whereas, the "play along" mode is typically utilized where an individual user wishes to create a musical composition by using the cell phone as a musical instrument to accompany another music source such as a computer that is playing a CD, an MP3 file, or other digital source. The "play with" mode is directed more toward a multi-user arrangement (e.g., FIG. 3), whereas the "play along" mode is directed more toward a situation where the user is playing along or in accompaniment to a musical source (FIG. 4).

In connection with FIGS. 1 and 2, in a preferred arrangement a user will interact with the instant invention by way of the graphical display 110 of the cell phone 100 or other mobile computing device (e.g., a handheld computer/PDA, a combination cell phone PDA, etc.). Preferably, a screen layout similar to that which appears on the display 110 will be provided to the user to allow him or her to select between the two preferred operating modes. The standard telephone keypad 120 can be used for the purpose of scrolling and/or selecting from among the menu items 105 or, alternatively, the various special function keys that are often provided with the cell phone 100 could also be used for this same purpose. Finally, many cell phones and other devices utilize "soft keys" which are graphical representations of buttons that are drawn on the display device 110 and which could also be used to receive instructions from a user. Those of ordinary skill in the art will recognize that interaction with the user can also be carried by use of different methods and/or devices (to include the user of peripherals that have been attached to the cell phone) and are not limited to the use of the physical buttons that might be present on the face of the selected device.

Turning next to FIG. 3, this figure illustrates in a general way a preferred arrangement of the "play with" feature of the instant invention, wherein multiple cell phones 310–340 are utilized, thereby allowing all of the participating users to create a composite musical work. As is generally illustrated in this figure, in a multi-user environment a first user will initiate the jam session and, for purposes of clarity hereinafter, that user's phone will be designated as the master phone 310. As is also indicated in this figure, it is preferred that multiple other participants be brought together to create music, with the number of participant users not being limited to any specific number. The mobile devices 320 to 340 of the other participants will be referred to hereinafter as "accompanying", "non-master" or "slave" units.

Figure 6:
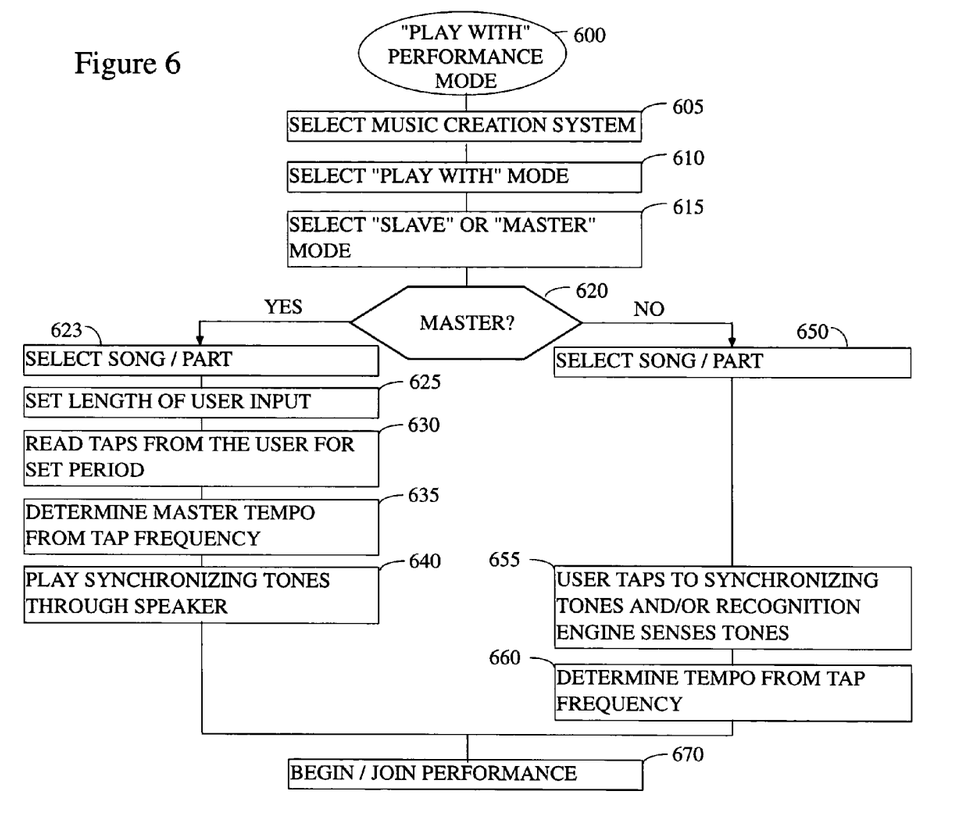
FIG. 6 contains a flowchart of basic variant of the "play with" mode.

Turning next to the software components of the instant invention, in practice, a cell phone 100 will have been pre-loaded with specialized music creation software that is designed to minimally perform the functions of FIG. 6, which generally illustrates the "play with" aspect 600 of the instant invention. As a first step in the preferred music creation process, an owner of such a cellular phone determines to create music and selects the software within the cell phone that makes this possible (step 605). Preferably such software will include options to perform both the "play with" and "play along" embodiments and will present both options to the user via the cell phone display (e.g., using menu items 205).

As a next preferred step, the user will select between the options "playing with" or "playing along" (step 610). Assuming for purposes of discussion that the user has selected the "play with" mode (step 610), an inquiry will next be made to determine whether the user desires to initiate the performance (i.e., whether the user wishes his or her cell phone to act as the "master" phone) or whether he or she wants to accompany another's cell phone performance (steps 615 and 620). If the user desires to initiate the performance, a next preferred step would be to select a song and a part (step 623). That is, in the preferred arrangement the user will select a specific song from among a list of one or more such songs. Alternatively, the user might automatically be assigned a song and that would be the case, for example, if the cell phone were supplied with a single song. Additionally, it should be noted that the term "song" should be interpreted in its broadest sense to include traditional songs as well as simple rhythm patterns (e.g., a looped drum track), random chord changes, or any other musical or rhythmic pattern that a user might wish to accompany. Note that it is preferable that the songs be stored within the local memory (e.g., computer RAM, ROM, flash RAM, etc.) of each cell phone either as digital music files (e.g., MP3, WAV, AIF, etc.) or as MIDI files. However, it is certainly possible that the music files could be downloaded to each cell phone from a central server in real time as needed, in which case the song would be stored at a remote location.

Additionally, and according to another preferred embodiment, the instant invention will operate to allow a user to compose a new song by using the musical loops provided. In such an embodiment, the "master" user would not select a specific song but would instead merely select a song style (e.g., Latin, swing, rock, blues, etc.). Then, given the song style, the master user's cell phone will preferably begin to play general song patterns or riffs that are consistent with the selected style, during which time the user will be free to accompany the background music and create a unique composition. Note that, for purposes of the instant disclosure, when the term "song" is used that term should be broadly construed to include conventional songs as well as song patterns or riffs in a particular style.

Further, the user will likely also want to select a "part" to play in concert with the selected song (step 623), although this choice could certainly have been made in advance by the software developer. By "part" is meant, for example, an instrument type (e.g., a piano sound, a guitar sound, a trumpet sound, an entire sampled orchestra, a synthesized sound, etc.). It could also mean the length or complexity of the sound that is produced by each button press. (e.g., a single note of an instrument, an entire measure or musical phrase, etc.). In brief, when the user specifies which part he or she would like to play that step might include any choice that relates to the quality or quantity of sound produced by each button press during the performance.

As a next preferred step 625, the originating user will be given the option of setting the length of time (or the number of taps) that will be provided by the user in order to set the tempo of the selected song. Although setting the tempo might be done in any number of ways, in the preferred embodiment the user will press a cell phone key repeatedly at the tempo that he or she wishes the selected song to be played, thereby communicating a preferred tempo to the software resident therein. Usually only a few taps (e.g., 5 to 10) will be necessary to establish the rhythm. Those of ordinary skill in the art will recognize that there are many other ways that the user might set the tempo including, without limitation, specifying a numerical beats-per-minutes value, playing the selected song and allowing the user to speed it up or slow it down interactively, etc. That being said, the instant inventors find that the "tap-in" method is especially convenient and intuitive. If the user has elected to tap-in the tempo, the cell phone software will next preferably use that information to calculate the tempo according to methods well known to those of ordinary skill in the art (step 635). Note that in some cases, rather than specifying a tempo via steps 625 through 635, the user might instead accept the default tempo for the chosen musical work (i.e., the tempo selected by the individual who created the stored musical work). As a consequence, for purposes of the instant disclosure, when a tempo is said to be "selected" that language should be interpreted to include cases where the user selects the tempo, where the creator of the musical work has previously selected it by specifying it as a default value, etc. Similarly, that same sort interpretation should also be applied to the case where a song is "selected", i.e., a song will be said to have been "selected" even if a single song is the only possible choice.

As a next preferred step, the instant invention will continue by playing a predetermined number of tones through the cell phone speaker (step 640) at the tempo that was specified by the user. This step has two main purposes. First, it acts as an introduction or lead-in for the owner of the master phone and will allow him or her to start playing an accompaniment at the same time that the musical selection starts. Additionally, and as is described in greater detail below, this provides a convenient way for other users who might be within hearing distance to join in at the same tempo. Also, and as is discussed in greater detail below, in some instances the transmitted taps will be used as a way of communicating with the slave cell phones via the recognition engine software resident therein.

Finally, the master cell phone will begin playing the selected musical work at the selected tempo (step 670). This will be the cue for the cell phone's owner to begin playing in concert by pressing various of the cell phone buttons. Each such button press will result in the playing of a sound of some sort through the cell phone speaker in conjunction with the playing of the selected musical work. In one preferred embodiment, each sound that is generated will be a simple beep such as is typically available by default in cellular telephones (e.g., the standard DTMF phone tones) and/or others sorts of tones that are synthesized internally by the phone. In other preferred embodiments, each button might be associated with a single digitally recorded or sampled sound (e.g., a digital sampling of horn playing a single note), a recorded musical phrase (e.g., one digitally sampled measure of a piano playing) or even more complex recorded sounds. Of course, rather than using sampled sounds, the CPU within the cell phone could create synthesized sounds (e.g., sounds that are synthesized according to a mathematical algorithm) according to methods well known to those of ordinary skill in the art. For purposes of the instant disclosure, the one or more buttons/keys that will be pressed to create the user-generated musical component will be referred to as the performance keys. Finally, in some embodiments it would be preferable to have the cell phone store the actual button presses and their timing, together with some indication of the loop that is played in response thereto. This would allow the phone to function somewhat like a tape recorder (or sequencer) so that the user's musical composition could be stored and later replayed if it turned out to be especially pleasant.

Preferably the sounds that are played in response to performance key presses will have been pre-selected by the software designer and/or the user to complement the musical work that is currently playing. For example, if the selected musical work is in the key of C and is written in 4/4 time, then the samples which are selected by the button presses will preferably includes notes or musical phrases that are compatible with the key of C and will be similarly suitable for play in 4/4 time. As another example, if the underlying work is from the blues genre, the notes, musical scales, and musical phrases that are provided to the user will preferably also be from that same musical genre. Those of ordinary skill in the art will understand how this might readily be done for a particular musical work and, more generally, for a musical work in a given genre, key, and time signature and which moves through predetermined chord changes. Thus, in this embodiment the novice user need only press the cell phone keys—even press them randomly—and, a harmonious accompaniment will result. It is preferred that the notes and sounds which are triggered by the user are played through the cell phone speaker together with the underlying musical work. In such a fashion, the notes from the master and other users will combine together to create a pleasing musical work.

In other embodiments, the software within the cell phone will act to help the user select which specific sounds are played in response to a button press and the timing of those sounds. For example, in one preferred embodiment the user's button press will only be used to determine the relative timing of the note that is played, with the actual sound selection being made automatically so as to harmoniously accompany the musical work that is playing. In this embodiment, the user could repeatedly press the same key and have a potentially different/complementary sound played each time the key is pressed. In another preferred embodiment, the user's pressing of the performance key or keys will not be played immediately, but instead the sound that corresponds thereto will be delayed until it can be played in tempo with the underlying musical work. Obviously, such an arrangement would be a boon to the user who is rhythmically challenged.

Of course, it is certainly possible that the user might be given more precise control over the actual notes and/or sounds that are played than has been described previously. In such an instance, some level of skill would be required of that user to press the correct performance key in a near-exact rhythmic match with the selected and currently playing musical work, just as he or she would do if a traditional musical instrument were being played.

Turning now to the right hand branch in FIG. 6 (steps 650 through 660) which describes the functioning of the slave cell phones, if the user has elected to participate in the music creation process as an accompanist (i.e., this is a "slave" phone), that user will preferably begin by selecting the same song as that which was specified by the master cell phone owner (step 650). Note that it is only preferred that the same songs be selected by each accompanist, as there could certainly be circumstances where it would be desirable to choose a different or complementary song. Additionally, the accompanist will likely wish to select a part to play which, as has been described previously, complements the selected tune and/or the part selected by the master cell phone owner. Additionally, in the event that the users would like to create a new musical arrangement, the accompanist wouldn't necessarily be required to select the same song as that which was specified by the master cell phone owner. In this event it would suffice to synchronize the slave device to the master device to start the music creation process.

As a next preferred step, the accompanist will typically wish to synchronize his or her cell phone's playing of the song with that of the master unit. To that end, a first preferable way of implementing that synchronization is by having the accompanist tap the tempo of the master phone into the slave cell phone (step 655). As has been described previously, on cue the master cell phone will preferably play a series of synchronizing tones (e.g., 5 to 10) through its speaker in advance of beginning to play the selected song (step 640). Then, it is preferred that the tempo of the accompanying phone will be set by the user by tapping one of its cell phone keys in time with the tones that are being broadcast from the master phone's speaker. Clearly, other users who are in the vicinity may also participate in the same manner. Alternatively, a second preferred method of determining the tempo of the master cell phone is by utilizing the recognition engine discussed below. For purposes of the instant disclosure, the key that is tapped to set the tempo will be known hereinafter as the sync key. Of course, the sync key may serve multiple functions.\. This is just a reflection of the fact that a typical cell phone does not have many keys and, as such, some keys may have multiple functions associated therewith.

From the standpoint of the holder of the master phone, upon receipt of acknowledgement from the participating users that they are ready, the inviter presses a button to initiate the playing of the selected song or to initiate the music creation process. As has been described previously, prior to the song's start an audible series of tones (e.g., "beeps") is preferably generated by the master phone to indicate the selected tempo of the music that is to follow. The participating users will then preferably "tap-in" using the designated sync key to synchronize their phones. By doing this, the owner of each accompanying phone will be able to at least approximately synchronize his or her phone with the master. Alternatively, each user could synchronize his or her cell phone by tapping in after the master phone has already started playing a musical work. However, such may not result in composite works that are as euphonious as those where all of the cell phones start together. That being said, in some preferred embodiments the user will be provided with one or more buttons that will cause the resident software to jump to, say, the start of the song, the chorus, the bridge, etc., at the next measure, thereby allowing a late participant to catch up with a song that is currently in progress. Further, in the case where the underlying music is a repeating (e.g., looping) chord structure, users could readily join in each time the chord pattern begins to repeat.

Turning next to a description of the "play along" aspect of the instant invention, as is generally indicated in FIG. 4 in one preferred arrangement the user will play a cell phone 410 in concert with a musical work that is being played by computer or any other device 420 through speakers 430. In the preferred arrangement case, the computer 420 will act similarly to the master cell phone discussed previously. Note, though, that the microphone 440 provides the computer 420 with the capability of receiving audible instructions from the user or from the cell phone 410, which means that the computer could function in the role of a "slave" if so desired (e.g., if a user elected to "accompany" a song being played on the cell phone 410 by rhythmically pressing keys on the computer 420 in time therewith). The source of the music that is played by the computer might be, for example, taken from a separate (or integrated) CD player, a DVD player, an MP3 (or other digital music) player, a record player, etc. Further, to the extent that the computer is functioning as passive music source, that function could be performed by a stereo system, boom box, etc.

Figure 8:
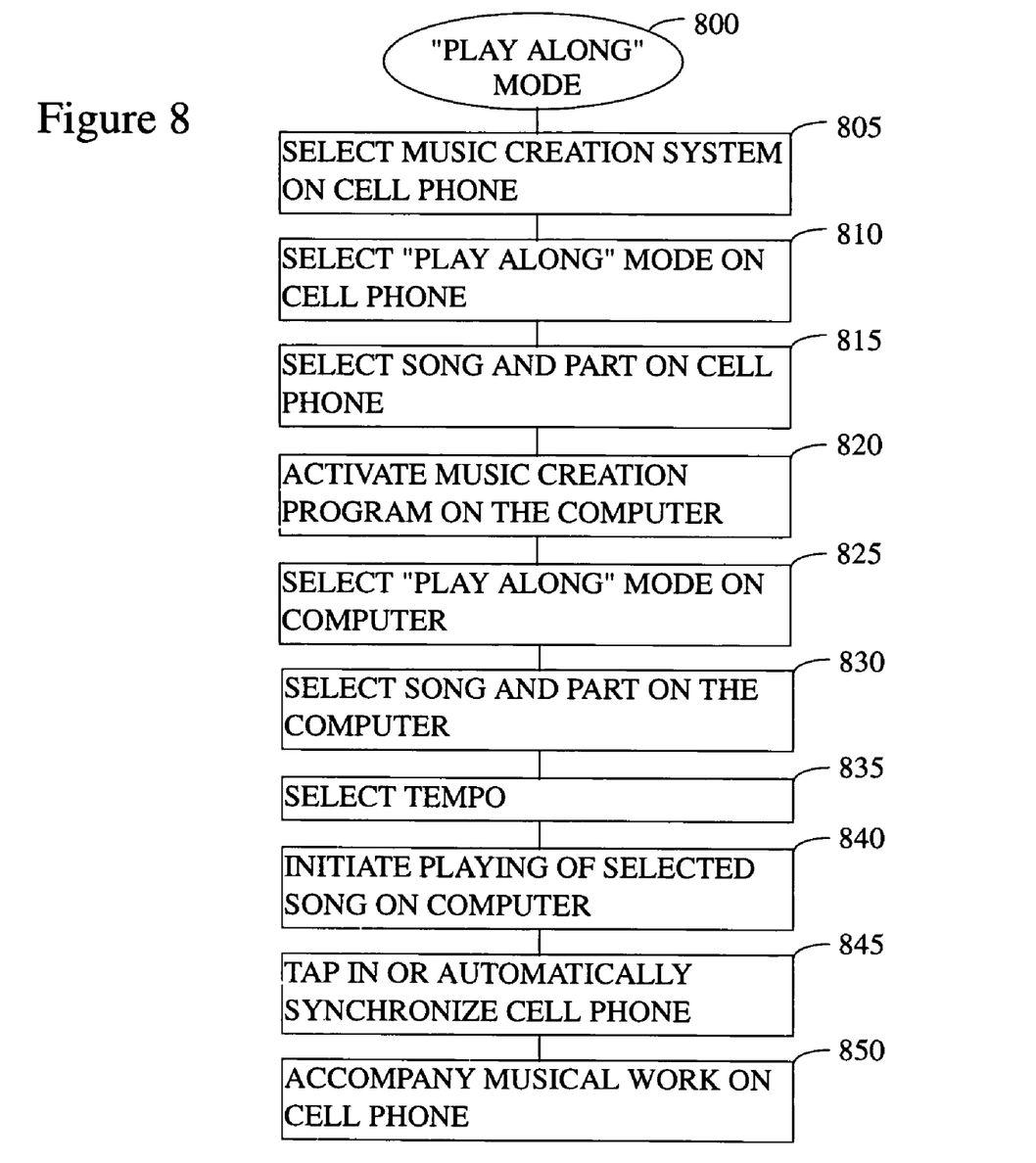
FIG. 8 illustrates a preferred program logic for use with the "play along" mode of the instant invention.

As is indicated in FIG. 8, in one preferred embodiment of the "play along" mode 800 the user will begin by selecting the music creation system within the cell phone (step 805) and then choose the "play along" option (step 810). Preferably, the user will also select a song and a part (step 815) on the cell phone as has been discussed previously.

Next, the user will typically activate the music creation program that is resident on the computer (step 820). In this embodiment, the computer music creation program will function similarly to the program that resides on a master cell phone in that it will "lead" the performance. That is, the user will preferably instruct the computer software that a "play along" performance is desired (step 825) and then continue to select the performance tempo (step 835) preferably by tapping in the desired tempo on the keyboard or mouse and the song (step 830). Optionally, a part might be selected as well (step 830) if, for example, a second user wished to "play" the computer by pressing its keys in a fashion analogous to that described previously in connection with a cell phone performance. It should be noted that the tempo could certainly be set directly by typing in a desired BPM (i.e., beats per minute) value or by some other means.

In another embodiment of the "play along" mode, the user will not need to configure specific settings for the device that is to be accompanied. In the instant scenario, the user will need only to establish a tempo, which will preferably be done by tapping in concert either with lead-in tones provided for that purpose or with the song that is currently playing. As a consequence, the "play along" mode is not limited to use with a computer as the "master" or source device, but rather the "master" device could be any device that transmits music/sounds.

Next the user will preferably initiate the playing of the selected song at the desired tempo on the computer (step 840). Note the performance will preferably provide for synchronization as has been discussed previously, e.g., by sounding a series of tones in advance of starting the playback of the song, thereby allowing the cell phone user to manually synchronize the phone with the computer (step 845). Note that the methods of automatic synchronization discussed below could also be used.

Finally, the user will now be able to accompany the playback of the selected music work by pressing the performance keys on the cell phone (step 850) as has been discussed previously. Rather than hearing the music from the "master" via the speaker of a cell phone, the user will instead hear the rich tones that can be produced by the large speakers 430 that are suitable for use with a personal computer.

Those of ordinary skill in the art will recognize that, if so desired, the roles of "master" and "non-master" could certainly be reversed and the cell phone could function as the master with respect to the computer.

Figure 5:
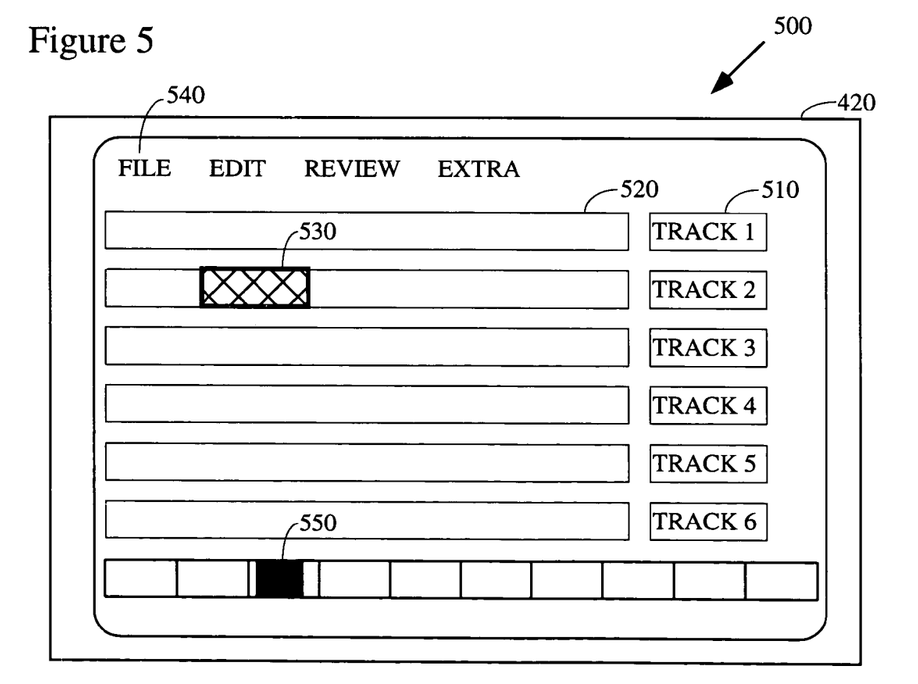
FIG. 5 depicts an embodiment of a graphical user interface suitable for use with the instant invention.

FIG. 5 illustrates a screen display of the general sort that would be appropriate for creating musical works on a computer that could thereafter be played according to the instant invention. As is conventionally done in such programs, there are provided a plurality of separate tracks that are suitable for storing musical clips therein. The screen representations of such tracks 510 are typically designed to let a user add, delete, and reposition graphical representations of music clips by manipulating the cursor 530 on the screen. As is well known to those of ordinary skill in the art, often the multiple tracks (six tracks in this figure) are filled with music clips and then mixed down to two (i.e., stereo) tracks to prepare the work to be played on conventional stereo equipment. Software of the sort represented by FIG. 5 could be used to compose musical works that would be suitable for performance via the instant invention. More particularly, the screen display of FIG. 5 illustrates the graphical user interface of one embodiment of the instant invention. This embodiment is primarily directed to the music creation process, therefore the screen display corresponds to the graphical user interface on both the master and the slave devices participating in the play along as well as the play with mode, at least to the extent—that the dissimilarities in screen size make display of the same graphic user interface possible.

Finally, and according to still another preferred embodiment, there is provided a method of creating music on a plurality of cellular telephones or on a cell phone and another computing device, wherein the cell phones are automatically synchronized without the need for manual tapping. In one preferred embodiment, a recognition engine will be used to automatically identify beats from the master cell phone and to set the tempo and starting time accordingly. That is, this embodiment automates steps 655 and 660 discussed previously.

In the instant embodiment, each participating non-master cell phone will utilize a software recognition engine that automatically synchronizes it with the master cell phone. In more particular and as is generally set out in FIGS. 6 and 7, according to the instant embodiment the master cell phone will signal to cell phones proximate thereto that a song is about to commence, preferably by sounding a series of tones through its speaker. This series of tones will preferably be sonically distinct so that the non-master phones will be able to distinguish them from background noise. In the preferred arrangement, the recognition engine within each participating cell phone will sense the transmission of synchronizing information, determine the tempo associated therewith, and begin to play its own copy of the chosen song at the appropriate moment, thereafter allowing the user to accompany the playing song according to the methods discussed previously.

Figure 7:
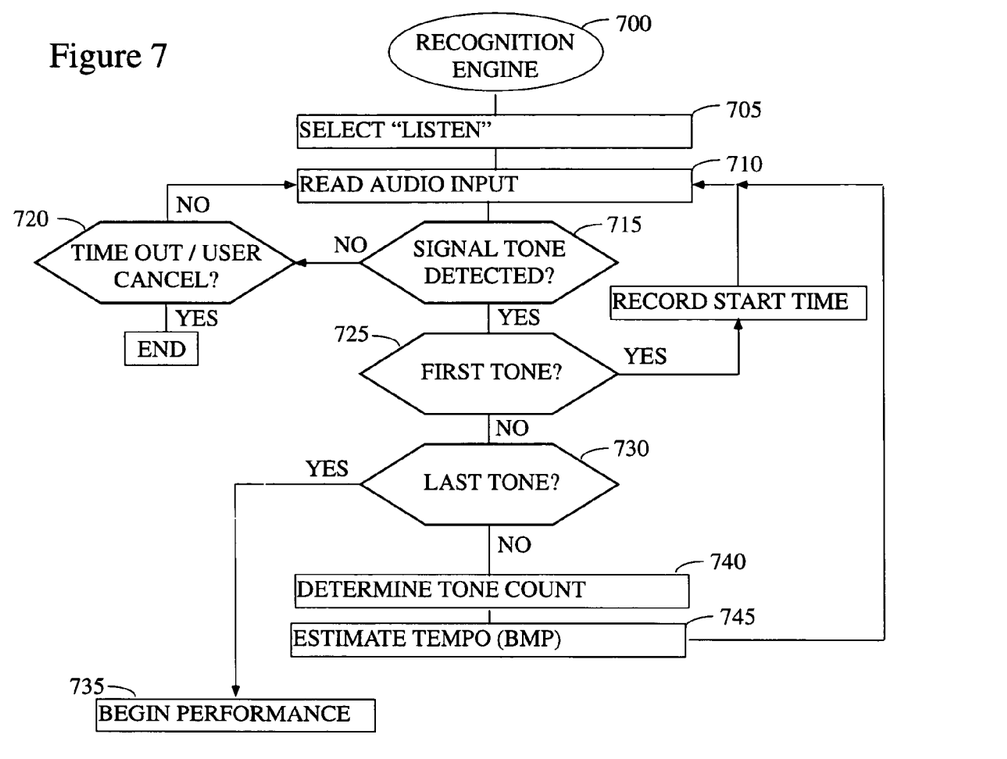
FIG. 7 contains an illustration of a preferred recognition engine logic.

As is set out in greater detail in FIG. 7, the owner of a non-master cell phone, after selection of the song and part, will preferably engage the recognition engine to cause his or her cell phone to be receptive to the receipt of signal tones (steps 700 and 705). Next, a loop is preferably entered that will read the audio input from the cell phone receiver (step 710) or other audio input source and convert it to digital form. The incoming sound stream will then preferably be continuously analyzed to determine whether a signal tone is present (step 715). If not, a further check is preferably made to determine whether or not the user has cancelled his or her "listen" command or whether some predetermined period of time has elapsed and the phone should return to normal operations (i.e., the "time out" in step 720).

However, in the event that a signal tone has been detected, a next preferred step will be to determine whether it is the last tone of the series (step 730). If so, the user's cell phone will then begin to broadcast the selected song at the determined tempo/BPM (step 735). Note that those of ordinary skill in the art will readily be able to devise many different ways to differentiate a "last" tone including, without limitation, varying its frequency content from the tones preceding it, changing its duration, playing a tone on the half-beat that immediately precedes the last tone, etc. Of course, in the preferred arrangement the total number of tones that are to be sounded will be known in advance (e.g., as might have been specified by the user). However, if the slave cell phone misses one or more of the synchronizing tones (e.g., due to the presence of intermittent noise) it may be necessary to provide the phone software additional information to make certain that it begins playing the selected tone at exactly the correct moment, hence, the preferred different "last" tone.

Figure 9:
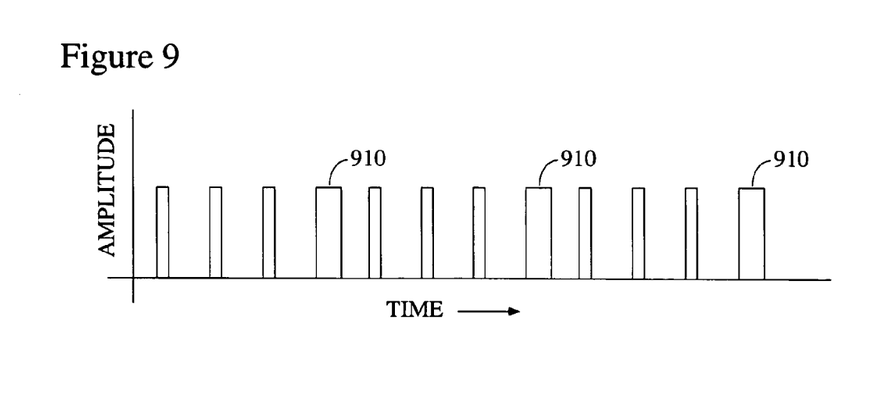
FIG. 9 illustrates a preferred signalling mechanism for use in communicating a tempo from a master cell phone to a slave cell phone.

On the other hand, if the detected tone is not the last tone in the series the instant method preferably continues by determining the tone count (step 740) and an estimate of the tempo (step 745), before returning to the top of the input loop (step 710). Clearly, given the starting time of the tone series (or, equivalently, at least one time separation between successive tones) an estimate of the BPM/tempo of the music may readily be determined according to methods well known to those of ordinary skill in the art. Further, in some cases it might be desirable to modify each tone to identify, for example, its location within the measure. For example and as is generally indicated in FIG. 9, if the last tone 910 of a 4-beat measure were, say, slightly longer than the other three tones in a measure, that would allow the slave units to more reliably determine the timing necessary for synchronization. In this figure, the width of each pulse is proportional to the length of time that the corresponding tone would be played by the master phone. Note that, although this figure might suggest that each of the synchronizing tones would be played at the same amplitude, that is only a preferred embodiment and it is certainly possible that variations in amplitude could be used in communicating with the slave phones. Similarly, if the second, third, fourth beats were, say, sounded at a slightly different pitch or given some other distinguishable quality those sorts of variations could similarly improve the chances for a successful synchronization. Those of ordinary skill in the art will be able to devise many other schemes of the same general sort.

Finally, it should be clear to those of ordinary skill in the art that the determination of whether or not a synchronizing tone is currently being played by the master device (step 715) might be accomplished in many different ways. In one preferred embodiment, the sound that is read from the microphone 130 will be converted to a digital time series, after which standard signal processing techniques can be applied thereto. For example, by taking short-time (or longer) Fourier transforms of the incoming signal it will be possible to identify signals that are within predetermined frequency bands (e.g., within the 1 kHz to 2 kHz frequency range) or that have predetermined frequency characteristics (e.g., a frequency sweep, DTMF tone signals, etc.). Clearly, such an approach could be invaluable in the presence of noise.

CONCLUSIONS

Those of ordinary skill in the art will recognize that, although the instant invention preferably works with cell phones, many other devices would also be suitable. As has been mentioned previously, at a minimum the instant invention requires a handheld device which includes a microprocessor or similar programmable device and which is capable of wireless or wired communications. For example, hand held computing devices such as those utilizing the Palm® and Windows CE® operating systems would certainly be suitable for use with the instant invention and it is contemplated that such devices could readily be intermixed (e.g., one or more cell phones and one or more PDAs) to create a joint musical work as has been described previously. Further, in light of the recent trend toward blurring the lines of distinction between cellular telephones and PDAs—consider, for example, the many combined cell phone/PDA hardware offerings—such a mixed performance (PDAs and cell phones) is perhaps the more likely scenario. Thus, in the specification and claims of this disclosure, when the term "mobile computing device" is used, that term should be interpreted in its broadest sense to include any device that meets the minimal requirements set out above, whether or not that device is capable of voice communication.

Further, those of ordinary skill in the art will recognize that there are many active devices that could serve for purposes of the instant invention as a CPU within a cell phone or other electronic device. More particularly, the instant invention minimally requires that the microprocessor/CPU be an active device, i.e., one that is minimally programmable to achieve the functionality required (e.g., reading a song choice from the user, reading the user's input tempo, synchronization with other phones, etc.). Of course, these sorts of modest requirements may be satisfied by any number of programmable logic devices ("PLD") including, without limitation, gate arrays, FPGA's (i.e., field programmable gate arrays), CPLD's (i.e., complex PLD's), EPLD's (i.e., erasable PLD's), SPLD's (i.e., simple PLD's), PAL's (programmable array logic), FPLA's (i.e., field programmable logic array), FPLS (i.e., fuse programmable logic sequencers), GAL (i.e., generic array logic), PLA (i.e., programmable logic array), FPAA (i.e., field programmable analog array), PsoC (i.e., programmable system-on-chip), SoC (i.e., system-on-chip), CsoC (i.e., configurable system-on-chip), ASIC (i.e., application specific integrated chip), etc., as those acronyms and their associated devices are known and used in the art. Further, those of ordinary skill in the art will recognize that many of these sorts of devices contain microprocessors integral thereto. Thus, for purposes of the instant disclosure the terms "processor," "microprocessor" and "CPU" (i.e., central processing unit) should be interpreted to take the broadest possible meaning herein, and such meaning is intended to include any PLD or other programmable device.

Still further, it should be noted that for purposes of the instant disclosure that when a value of a parameter is "selected" or "chosen", that language should be clearly understood to encompass the case where the user selects the value or where the computer/software selects the value. Thus, these terms should be broadly construed to cover the situation where there is a single program option or parameter value and the software automatically chooses the single possible value without intervention by the user.

Of course, many modifications and extensions could be made to the instant invention by those of ordinary skill in the art. In one preferred embodiment, the user can choose to display the music lyrics so that the user can sing along in a karaoke-like fashion with the music that is broadcast during the "play with" embodiment. That is, in this embodiment the user sings along with—rather than accompanies—synchronized music that is playing on two or more mobile computing devices. Thus, the performance step 670 in FIG. 6 is (in part or in total) a vocal event, preferably with the cell phone/PDA displaying the song lyrics in tempo to the music as an aid to the user. Note that in some preferred embodiments, there will be no need to synchronize the cell phone with an external music source but, instead, the cell phone will simply function in a stand-alone mode and play the selected song through a speaker at the selected tempo while simultaneously displaying the song lyrics on the cell phone display timed to match the playing of the song (e.g., scrolling the typically small cell phone display to reveal successive sections of the text), thereby allowing the user to readily sing in accompaniment thereto. Further, in some preferred embodiments the users will not actually participate in any fashion (e.g., they will not sing or "play" along) with the currently selected and playing musical work but instead will simply listen to the synchronized music that originates from a plurality of mobile computing devices. In this case, the performance of step 670 would simply be the playing of a synchronized musical work from two or more mobile computing devices. Those of ordinary skill in the art will be able to devise many other variations and arrangements of the instant methods.

Finally, it should be noted and remembered that when a user is said to "press a button" on his or her cell phone while music is playing therefrom, that phrase should be broadly construed to include cases where a hardware button (e.g., one of the keypad buttons 120 or a special purpose function button) is pressed as well as cases where the user presses a "button" that is a graphic representation that has been drawn on a touch screen. Further, those of ordinary skill in the art will recognize that the button that is used for synchronization could also be reused subsequently during a performance, i.e., each button could serve multiple roles/functions depending on the state of the software at the time the button is pressed. Said another way, the fact that a particular button has been used during synchronization would not preclude that same button from functioning as a "note" button later during performance.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of creating a joint musical work, wherein is provided a plurality of mobile computing devices, each of said plurality of computing devices having at least one song accessible thereby, comprising the steps of:
   (a) selecting a master computing device from among said plurality of mobile computing devices;
   (b) using said master computing device to select one of said accessible songs;
   (c) choosing a tempo of said selected song;
   (d) selecting at least one accompanying computing device from said plurality of mobile computing devices;
   (e) choosing said selected song within at least one of said at least one accompanying computing devices;
   (f) synchronizing at least approximately said at least one accompanying computing device with said master computing device;
   (g) simultaneously playing at least a portion of a representation of said selected song on said master computing device and on said accompanying computing device, said playing of said representation of said selected song on said master and accompanying computing devices being at least approximately synchronized;
   (h) identifying one or more master performance keys on said master computing device, each of said one or more master performance keys causing said master computing device to emit one or more sounds that are consistent with said selected song when any of said performance keys is pressed during the playing of said song;
   (i) identifying one or more accompanying performance keys on said accompanying computing devices, each of said one or more accompanying performance keys causing said accompanying computing device to emit one or more sounds that are consistent with said selected song when any of said accompanying performance keys is pressed during the playing of said song,
   (j) pressing one or more of said master performance keys in concert with said playing of said selected song on said master computing device; and,
   (k) pressing one or more of said accompanying performance keys in concert with said playing of said selected song on said master computing device, thereby creating a joint musical work.

2. A method of creating a joint musical composition according to claim 1, wherein said mobile computing devices are selected from a group consisting of a cellular phone, a PDA, a handheld computer, and a combined cellular phone/PDA.

3. A method of creating a joint musical composition according to claim 1, wherein step (b) comprises the steps of:
   (b1) selecting one of said stored songs from within said master computing device, and,
   (b2) selecting a song part from within said master computing device,
and wherein step (h) comprises the step of:
   (h1) identifying one or more master performance keys on said master computing device, each of said one or more master performance keys causing said master computing device to emit a sound corresponding to said selected song part that is consistent with said selected song when pressed during the playing thereof.

4. A method of creating a joint musical composition according to claim 1, wherein step (f) comprises the steps of:
   (f1) broadcasting a series of synchronizing tones from said master computing device, said synchronizing tones being broadcast at a rate that is representative of said chosen tempo, and,
   (f2) tapping on a synchronizing button on at least one of said accompanying computing devices in concert with said broadcast of said sync tones, thereby defining a sync tempo for use by at least one of said accompanying computing devices, wherein said sync tempo is at least approximately equal to said chosen tempo.

5. A method according to claim 1, wherein at least one of said at least one songs is stored within said master computing device.

6. A method according to claim 1, further comprising the steps of:
   (l) within at least said master computing device, recording said pressing of said master performance keys; and,
   (m) storing a representation of said presses of said master performance keys, thereby creating a stored representation of at least a portion of said joint musical work.

7. A method according to claim 6, wherein step (m) comprises the steps of:
   (m1) within at least one of said accompanying computing devices, recording said pressing of said accompanying performance keys;
   (m2) storing a representation of said presses of said master performance keys, and,
   (m3) storing a representation of said presses of said at least one accompanying performance keys, thereby creating a stored representation of at least a portion of said joint musical work.

8. A method according to claim 1, wherein at least one of said accessible songs is contained in a storage module located within said master computing device.

9. A method according to claim 8, wherein said storage module is selected from a group consisting of RAM, ROM, EPROM, flash RAM, a memory card, non-volatile memory, and a hard disk.

10. A method of performing a musical work, wherein is provided
   a mobile computing device having at least a speaker, and,
   at least one song accessible by said mobile computing device, comprising the steps of:
   (a) selecting one of said stored songs within said mobile computing device;
   (b) selecting a tempo;
   (c) playing at least a portion of a representation of said selected song on said mobile computing device through said speaker at said selected tempo;
   (d) identifying one or more performance keys on said mobile computing device, each of said one or more performance keys causing said mobile computing device to emit a sound through said speaker that is consistent with said selected song when said each of said performance keys is pressed during the playing of said selected song; and,
   (e) pressing one or more of said performance keys in concert with said playing of said selected song, thereby creating a performance of said musical work.

11. A method according to claim 10, further comprising the steps of:
(f) recording said presses of said performance keys; and,
(g) storing a representation of said presses of said performance keys, thereby creating a stored representation of said musical work.

12. A method according to claim 10, wherein at least one of said at least one songs is stored within said mobile computing device.

13. A method according to claim 10, wherein said speaker comprises a pair of headphones.

14. A method of creating a joint musical composition according to claim 10, wherein said mobile computing devices are selected from a group consisting of a cellular phone, a PDA, a handheld computer, and a combined cellular phone/PDA.

15. A method of creating a joint musical composition, wherein is provided a plurality of mobile computing devices, each of said plurality of mobile computing devices having at least one song accessible thereby, comprising the steps of:
(a) selecting a first mobile computing device from among said plurality of mobile computing devices;
(b) selecting a second mobile computing device from among said plurality of mobile computing devices;
(c) choosing within said first mobile computing device one of said songs;
(d) choosing said selected song within second mobile computing device;
(e) within said first mobile computing device, selecting a tempo;
(f) playing a plurality of sync tones through a speaker of said first mobile computing device, wherein said sync tones are representative of said selected tempo;
(g) within said second mobile computing device sensing at least a portion of said plurality of sync tones;
(h) automatically determining an empirical tempo based on at least said sensed portion of said sync tones;
(i) playing at least a portion of a representation of said selected song on said first mobile computing device and on second mobile computing device, said playing of said representation of said selected song on said first and said second mobile computing devices being at least approximately synchronized, thereby creating a joint musical composition.

16. A method of creating a joint musical composition according to claim 15, further comprising the steps of:
(j) identifying one or more performance keys on said first cellular telephone, each of said one or more first cellular telephone performance keys causing said first cellular telephone to emit a sound that is consistent with said selected song when any of said performance keys is pressed during the playing of said song;
(k) identifying one or more performance keys on said second cellular telephone, each of said one or more second cellular telephone performance keys causing said second cellular telephone to emit a sound that is consistent with said selected song when any of said second cellular telephone performance keys is pressed during the playing of said song;
(l) pressing one or more of said first cellular telephone performance keys in concert with said playing of said selected song on said first cellular telephone; and,
(m) pressing one or more of said second cellular telephone performance keys in concert with said playing of said selected song on said second cellular telephone, thereby creating a joint musical work.

17. A method of creating a joint musical composition according to claim 15, wherein said mobile computing devices are selected from a group consisting of a cellular phone, a PDA, a handheld computer, and a combined cellular phone/PDA.

18. A method of performing a musical composition, wherein is provided
a mobile computing device having at least one song accessible thereby, and,
an accompanying music source, said accompanying music source having access to at least one of said at least one song accessible by said mobile computing device, comprising the steps of:
(a) using said mobile computing device to select one of said accessible songs;
(b) choosing a tempo of said selected song;
(c) identifying said selected song within said accompanying music source;
(d) playing at least a portion of a representation of a selected song on said accompanying music source at said selected tempo;
(e) at least approximately synchronizing said mobile computing device and said accompanying music source,
(f) simultaneously playing at least a portion of a representation of said selected song on said accompanying music source and on said mobile computing device at approximately said selected tempo;
(g) identifying one or more performance keys on said mobile computing device, each of said one or more performance keys causing said mobile computing device to emit one or more sounds that are consistent with said selected song when any of said performance keys is pressed; and,
(h) pressing one or more of said performance keys in concert with said playing of said selected song on said accompanying music source, thereby creating a performance of said musical composition.

19. A method of creating a joint musical composition according to claim 18, wherein said music source is selected from a group consisting of a computer, a stereo system, a boom box, and a radio.

20. A method of creating a joint musical composition according to claim 18, wherein said at least one song accessible by said mobile computing device is stored on a device selected from a group consisting of RAM, ROM, flash RAM, EPROM, a CD disk, and a DVD disk.

21. A method of creating a joint musical composition according to claim 18, wherein said mobile computing device is selected from a group consisting of a cellular phone, a PDA, a handheld computer, and a combined cellular phone/PDA.

22. A method according to claim 18, further comprising the steps of:
(i) within said mobile computing device, recording said pressing of said performance keys; and,
(j) storing a representation of said presses of said performance keys, thereby creating a stored representation of at least a portion of said joint musical composition.

23. A method of creating a joint musical work, wherein is provided a plurality of mobile computing devices, each of said plurality of computing devices having at least one song accessible thereby, comprising the steps of:
(a) selecting a master computing device from among said plurality of mobile computing devices;
(b) using said master computing device to select one of said accessible songs;

(c) choosing a tempo of said selected song;
(d) selecting at least one accompanying computing device from said plurality of mobile computing devices;
(e) choosing said selected song within at least one of said at least one accompanying computing devices;
(f) synchronizing at least approximately said at least one accompanying computing device with said master computing device; and,
(g) simultaneously playing at least a portion of a representation of said selected song on said master computing device and on said accompanying computing device, said playing of said representation of said selected song on said master and accompanying computing devices being at least approximately synchronized, thereby creating a joint musical work.

24. A method of creating a joint musical composition according to claim 23, wherein said mobile computing devices are selected from a group consisting of a cellular phone, a PDA, a handheld computer, and a combined cellular phone/PDA.

25. A method of creating a joint musical composition according to claim 23, further comprising the steps of:
(h) identifying one or more performance keys on said first cellular telephone, each of said one or more first cellular telephone performance keys causing said first cellular telephone to emit a sound that is consistent with said selected song when any of said performance keys is pressed during the playing of said song;
(i) identifying one or more performance keys on said second cellular telephone, each of said one or more second cellular telephone performance keys causing said second cellular telephone to emit a sound that is consistent with said selected song when any of said second cellular telephone performance keys is pressed during the playing of said selected song;
(j) pressing one or more of said first cellular telephone performance keys in concert with said playing of said selected song on said first cellular telephone; and,
(k) pressing one or more of said second cellular telephone performance keys in concert with said playing of said selected song on said second cellular telephone, thereby creating an augmented joint musical work.

26. A method of creating a joint musical composition according to claim 23, wherein said selected song has lyrics associated therewith, and wherein said mobile computing device has a display integral thereto, said claim 23 further comprising the step of:
(h) displaying at least a portion of said song lyrics on said mobile computing display device in concert with said simultaneous playing of said at least a portion of said representation of said selected song.

* * * * *